Patented Apr. 5, 1932

1,852,032

UNITED STATES PATENT OFFICE

RICHARD STÜSSER, OF COLOGNE-DEUTZ, GERMANY, ASSIGNOR TO GENERAL ANILINE WORKS, INC., OF NEW YORK, N. Y., A CORPORATION OF DELAWARE

TRISAZO DYESTUFFS

No Drawing. Application filed February 16, 1928, Serial No. 254,903, and in Germany February 28, 1927.

The present invention relates to new trisazo dyestuffs of the general formula:

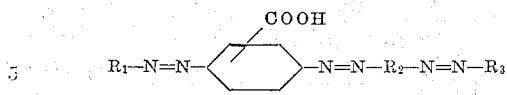

wherein $R_1$ and $R_3$ represent benzene nuclei and $R_2$ represents a naphthalene nucleus, at least one of the nuclei being substituted by a sulfonic acid group.

I have found that these dyestuffs in contradistinction to those heretofore known have the advantage of dyeing cotton already at room temperature or in the fulling mill and are capable of after-treatment with suitable metallic salts, for instance copper- or chromium salts, either in substance or on the fibre.

I prepare these dyestuffs by tetrazotizing the diamino azo dyestuffs derived from p-phenylene diamino carboxylic acids and coupling them, advantageously in the presence of tertiary bases with the desired azo component.

The dyestuffs thus obtainable are in the form of their alkali metal salts dark powders soluble in water, dissolving in strong sulfuric acid with a violet to black coloration and dyeing cotton fast red violet to black shades which yield on further treatment with suitable metallic salts dyeings fast to water, washing and light.

When reducing the dyestuffs with stannous chloride and hydrochloric acid among other products a p-phenylene-diamino-carboxylic acid is formed.

The following examples illustrate my invention without limiting it thereto:—

Example 1.—182 parts by weight of 5-nitro-2-amino-benzoic acid are diazotized in the customary manner and coupled with 239 parts by weight of 2-amino-8-hydroxy naphthalene-6-sulfonic acid in alkaline solution. 720 parts by weight of crystallized sodium sulfide are then added and the mixture is heated gradually until the reaction is complete, after which the dyestuff is salted out and filtered. It is then tetrazotized in the customary manner and coupled with 213 parts by weight of meta-phenylene diamine after rendering alkaline with sodium carbonate. The resulting trisazo dyestuff having in the free state the following formula:

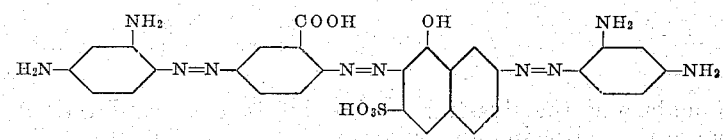

is then salted out and filtered. It forms a black powder, which dyes cotton a greenish black. By after-treatment of the dyeing with salts of heavy metals, in particular with copper salts, the fastness to washing and light is increased.

When treating the dyestuff with stannous chloride and hydrochloric acid it yields 1 molecule of 1.4-diamino benzene-2-carboxylic acid, 1 molecule of 1-hydroxy-2.7-diamino-naphthalene-3-sulfonic acid and 2 molecules of 1.2.4-triamino benzene.

Example 2.—The diamino azo dyestuff obtained according to the directions of Example 1 by reduction of the monoazo dyestuff from 182 parts by weight of 5-nitro-2-amino-benzoic acid and 239 parts by weight of 2-amino-8-hydroxy naphthalene-6-sulfonic acid is tetrazotized in the customary manner and coupled with 218 parts by weight of 3-amino-1-hydroxybenzene in acetic acid solution. The coupling is completed by rendering alkaline with sodium carbonate. The resulting dyestuff having in its free state the following formula:

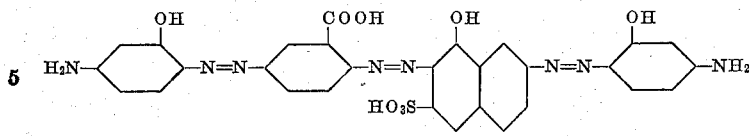

is salted out, filtered and dried. It forms a black powder, which dyes cotton greenish-black. Its affinity for cotton is so great that it even dyes cotton well in the fulling mill, the wool remaining white. By after treatment with copper salts the dyeings become redder and the fastness to washing and light is improved.

*Example 3.*—194 parts by weight of 4-acetyl-amino-aniline-3-carboxylic acid are diazotized with 69 parts by weight of sodium nitrite and 300 parts by weight of hydrochloric acid of 19½° Bé. and coupled with 239 parts by weight of 2-amino-8-hydroxy naphthalene-6-sulfonic acid in a solution rendered alkaline by means of sodium carbonate. The diamino monoazo dyestuff obtained from the resulting monoazo dyestuff by splitting off the acetyl group is then tetrazotized with 138 parts by weight of sodium nitrite and 600 parts by weight of hydrochloric acid and coupled with 244 parts by weight of meta-toluylene diamine in aqueous acetic acid solution. The coupling is completed by rendering alkaline with sodium carbonate and the dyestuff having in its free state the following formula:

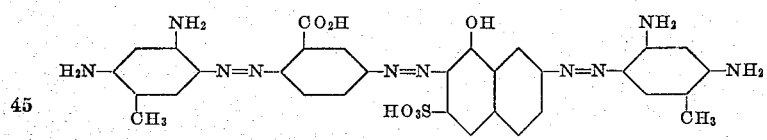

is salted out, filtered and dried. It forms a black powder, which dyes cotton black. The dyeings are rendered faster to washing by after treatment with copper salts.

I claim:—

1. New trisazo dyestuffs of the general formula:

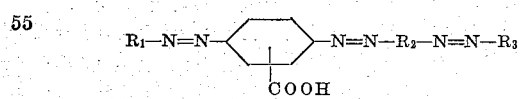

wherein $R_1$ and $R_3$ represent benzene nuleci and $R_2$ represents a naphthalene nucleus, at least one of the nuclei being substituted by a sulfonic acid group, said dyestuffs being in form of their alkali metal salts dark powders, soluble in water, dissolving in strong sulfuric acid with violet to black colors, dyeing cotton red violet to black shades, the fastness of which to water, light and washing is increased by after-treatment with suitable metal salts, yielding when reduced with stannous chloride and hydrochloric acid among other compounds 1.4-diamino benzene-2-carboxylic acid.

2. New trisazo dyestuffs of the general formula

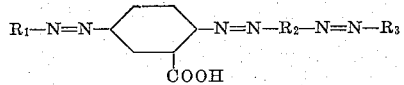

wherein $R_1$ and $R_3$ represent benzene nuclei and $R_2$ represents a napththalene nucleus, at least one of the nuclei being substituted by a sulfonic acid group, said dyestuffs being in form of their alkali metal salts dark powders soluble in water, dissolving in strong sulfuric acid with violet to black colors, dyeing cotton red violet to black shades, the fastness of which to water, light and washing is increased by after-treatment with suitable metal salts, yielding when reduced with stannous chloride and hydrochloric acid among other compounds 1.4-diamino benzene-2-carboxylic acid.

3. The trisazo dyestuff of the formula

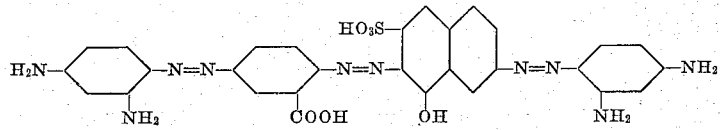

said dyestuff being in form of its alkali metal salts a black powder soluble in strong sulfuric acid with a black color, dyeing cotton a greenish black shade, the fastness of which to water, washing and light is increased by after treatment with suitable metal salts, yielding when reduced with stannous chloride and hydrochloric acid 1 molecule of 1.4-diamino benzene-2-carboxylic acid 1 molecule of 1-hydroxy-2.7-diamino naphthalene-3-sulfonic acid and 2 molecules of 1.2.4.-triamino benzene.

In testimony whereof I have hereunto set my hand.

RICHARD STÜSSER.